(12) United States Patent
Sugg et al.

(10) Patent No.: US 11,267,304 B2
(45) Date of Patent: Mar. 8, 2022

(54) LINKAGE INCLUDING COMPRESSIBLE BUSHINGS AND A METHOD OF INSTALLING

(71) Applicant: Federal-Mogul Motorparts LLC, Southfield, MI (US)

(72) Inventors: Brennan James Sugg, St. Louis, MO (US); Steve Schmitt, Shobonier, IL (US); Eric M. Kopsie, Bethalto, IL (US); Russell Andert, Ballwin, MO (US)

(73) Assignee: Federal-Mogul Motorparts, LLC, Southfield, MI (US)

( * ) Notice: Subject to any disclaimer, the term of this patent is extended or adjusted under 35 U.S.C. 154(b) by 109 days.

(21) Appl. No.: 16/449,847

(22) Filed: Jun. 24, 2019

(65) Prior Publication Data
US 2020/0398626 A1  Dec. 24, 2020

(51) Int. Cl.
*B60G 21/055* (2006.01)
*B60G 7/02* (2006.01)

(52) U.S. Cl.
CPC ............ *B60G 7/02* (2013.01); *B60G 21/055* (2013.01); *B60G 2202/135* (2013.01); *B60G 2204/1224* (2013.01)

(58) Field of Classification Search
CPC ............................................ B60G 2204/1224
See application file for complete search history.

(56) References Cited

U.S. PATENT DOCUMENTS

| | | | | |
|---|---|---|---|---|
| 1,830,787 A | * | 11/1931 | Ferry | B21K 1/704 411/429 |
| 3,938,822 A | * | 2/1976 | Guerriero | B60G 21/0551 280/86.758 |
| 4,944,523 A | * | 7/1990 | Hardy, Jr | B60G 21/0551 280/124.152 |

(Continued)

FOREIGN PATENT DOCUMENTS

| JP | 2014214852 A | * | 11/2014 |
|---|---|---|---|
| KR | 20130009041 A | * | 1/2013 |

OTHER PUBLICATIONS

Machine translation of JP2014214852A obtained from espacenet.com Jul. 2014 (Year: 2021).*

(Continued)

*Primary Examiner* — Paul N Dickson
*Assistant Examiner* — Maxwell L Meshaka
(74) *Attorney, Agent, or Firm* — Robert L. Stearns; Dickinson Wright, PLLC

(57) ABSTRACT

The suspension system includes a stabilizer bar which has an opening. The suspension system also includes a linkage, which includes a rod-shaped link and a pair of bushings that are made of a compressible material. The link presents male threads which extend to an end face and a stop out which is spaced from the end face, and the link extends through the opening of the stabilizer bar. One of the bushings is disposed on the rod-shaped link between the stop out and the opening of the stabilizer bar, and the other bushing is disposed on the link between the opening of the stabilizer bar and the locking nut. A locking nut is threadedly engaged with the link such (Continued)

that the end face of the link contacts a closed end of the locking nut. The bushings are partially compressed against the stabilizer bar.

20 Claims, 4 Drawing Sheets

(56) References Cited

U.S. PATENT DOCUMENTS

| | | | | |
|---|---|---|---|---|
| 5,704,631 A * | 1/1998 | Sparks | ............... | B60G 21/0551 |
| | | | | 280/124.101 |
| 2006/0226622 A1* | 10/2006 | Trotter | ..................... | B60G 7/02 |
| | | | | 280/124.107 |
| 2017/0129301 A1* | 5/2017 | Harvey | ................... | F16F 1/374 |
| 2018/0312027 A1* | 11/2018 | Harvey | .............. | B60G 21/0551 |

OTHER PUBLICATIONS

Machine translation of KR20130009041A obtained from espacenet.com Jul. 2014 (Year: 2021).*

* cited by examiner

LINKAGE INCLUDING COMPRESSIBLE BUSHINGS AND A METHOD OF INSTALLING

BACKGROUND OF THE INVENTION

1. Field of the Invention

The present invention is related generally to linkages and, more particularly, to stabilizer bar linkage assemblies.

2. Description of the Prior Art

Many vehicles include a stabilizer bar (also known as an anti-roll bar) to reduce body roll as the vehicle corners at speed. In most cases, the stabilizer bar is interconnected with another suspension component (such as a knuckle or a control arm) via a linkage that includes a plurality of compressible bushings. In order to optimize performance of the stabilizer bar, it is important to ensure that the bushings are compressed to a point within predetermined tolerances. One known means of compressing the bushings involves torqueing a nut which holds the bushings on the linkage down to a predetermined torque range.

SUMMARY OF THE INVENTION

One aspect of the present invention is related to a suspension system for a vehicle. The suspension system includes a stabilizer bar which has an opening. The suspension system also includes a linkage, which includes a rod-shaped link and a pair of bushings that are made of a compressible material. The link presents male threads which extend to an end face and a stop out which is spaced from the end face, and the link extends through the opening of the stabilizer bar. One of the bushings is disposed on the rod-shaped link between the stop out and the opening of the stabilizer bar, and the other bushing is disposed on the link between the opening of the stabilizer bar and the locking nut. A locking nut is threadedly engaged with the link such that the end face of the link contacts a closed end of the locking nut. The bushings are partially compressed against the stabilizer bar.

According to another aspect of the present invention, the locking nut has an outer surface that has a hexagonal shape.

According to yet another aspect of the present invention, a ball joint is secured to the link at an opposite end of the link from the end face.

According to still another aspect of the present invention, each of the bushings extends from an outer end that faces away from the stabilizer bar to an inner end that contacts the stabilizer bar, and the outer end has a greater outer diameter than the inner end.

According to a further aspect of the present invention, a washer is disposed between the stop out and one of the bushings, and another washer is disposed between the locking nut and the other bushing.

According to yet a further aspect of the present invention, the washers are received within counterbores of the bushings.

Another aspect of the present invention is related to a method of repairing a suspension system in a vehicle. The method includes the step of preparing a stabilizer bar that has an opening. The method proceeds with the step of preparing a link that is rod-shaped. The link has an end face and male threads adjacent the end face and has a stop out which is spaced from the end face. The method continues with the step of inserting a first washer onto the link and establishing contact between the first washer and the stop out. The method proceeds with the step of inserting a first bushing onto the link and establishing contact between the first bushing and the stop washer. The method continues with the step of inserting the link through the opening of the stabilizer bar and establishing contact between the stabilizer bar and the first bushing. The method proceeds with the step of inserting a second bushing onto the link and establishing contact between the second bushing and the stabilizer bar. The method continues with the step of inserting a second washer onto the link and establishing contact between the second washer and the second bushing. The method proceeds with the step of threading a locking nut onto the link until the end face of the link contacts a closed end of the locking nut and wherein threading the locking nut onto the link compresses the first and second bushings.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENTS

Figure 1:
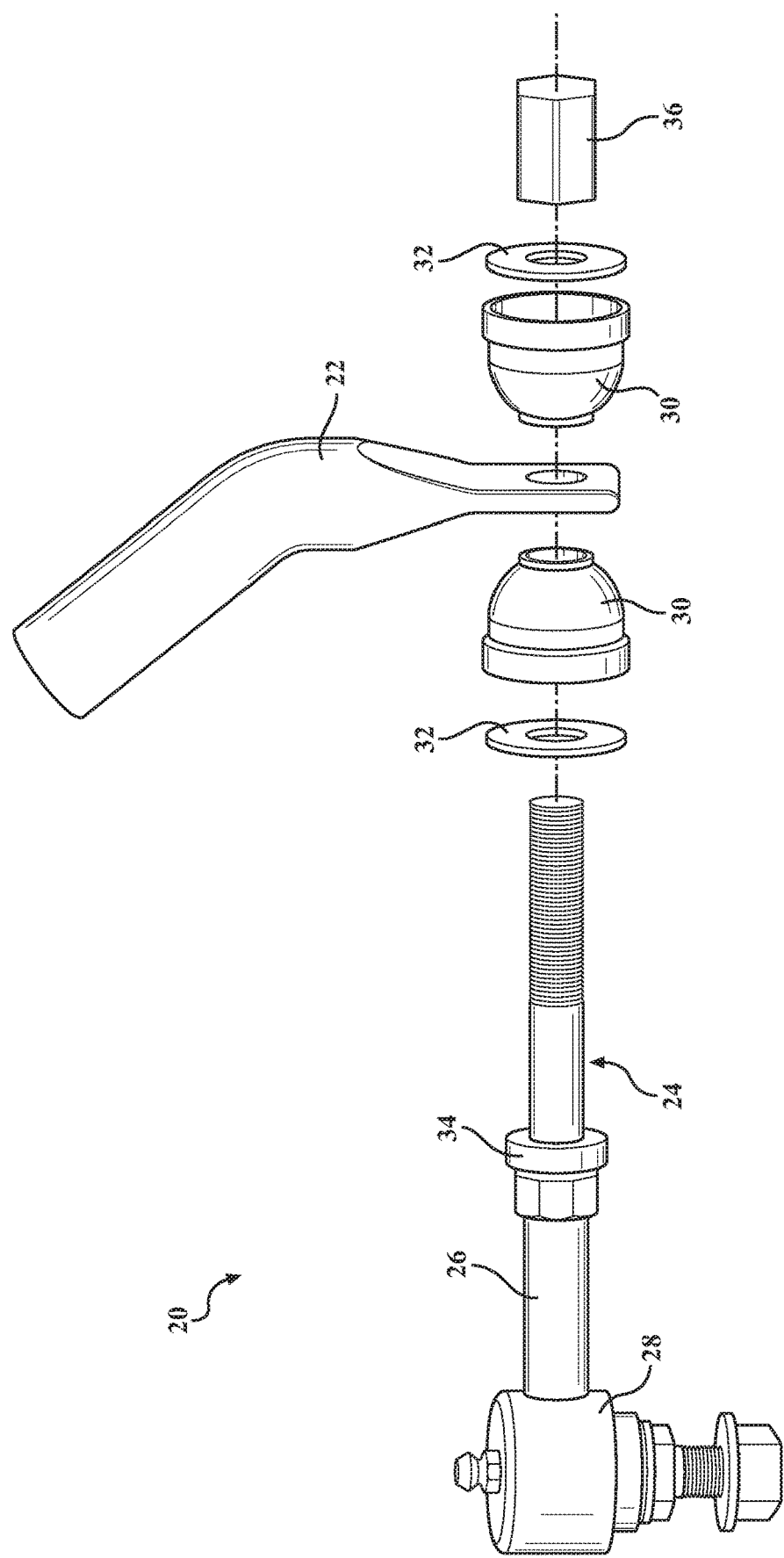
FIG. 1 is an exploded and partially fragmentary view of a suspension system constructed according to one aspect of the present invention.

Referring to the Figures, wherein like numerals indicate corresponding parts throughout the several views, a portion of a stabilizer bar assembly 20 for use in a vehicle suspension system is generally shown in FIG. 1. The stabilizer bar assembly 20 includes a stabilizer bar 22 (also known as an anti-roll bar) and a pair of linkages 24 (one being shown) that are adapted to connect the stabilizer bar 22 with a pair of suspension components, such as control arms (not shown) or knuckle (also not shown), on opposite sides of the vehicle. In operation, each linkage 24 transfers forces between a respective one of the suspension components and the stabilizer bar 22 as the stabilizer bar 22 twists in response to relative movement of the suspension components on the opposite sides of the vehicle to reduce body roll in the vehicle.

The linkage 24 is specifically configured so that it can be very quickly installed in the vehicle suspension system in a proper manner such that the components are tightened given tolerances. The linkage 24 includes a link 26, which is rod shaped, that extends linearly along an axis from a first end, which is unthreaded, to a second end, which is threaded and which has an end face. A ball joint 28 is fixedly attached with the first end of the link 26 for connecting the linkage 24 with the suspension component, e.g., the control arm or knuckle. The linkage 24 also includes a pair of bushings 30, a pair of washers 32, a stop out 34, and a locking nut 36. The linkage 24 may be packaged and sold as a kit which includes all of these components. In the exemplary embodiment, the link 26 is monolithic with a housing of the ball joint 28. Alternately, these components could be formed independently and then joined together. The link 26 is preferably made of metal, such as steel, an alloy steel, aluminum, an aluminum alloy, etc. and may be shaped through any suitable process or combination of processes.

The stop out 34 is located between the ball joint 28 and the second end of the link 26 at a predetermined distance from the second end of the link 26. In the exemplary embodiment, the stop out 34 is shaped similar to a nut and has an annular surface which faces away from the ball joint 28. The stop out 34 may be fixedly attached with the link 26 through any suitable joining means including, for example, welding and adhesives.

The stabilizer bar 22 extends between its own respective ends (only one of which is shown in the Figures). Each end of the stabilizer bar 22 is flattened to present a flange with a through opening formed therein. When installing the linkage 24 on a vehicle, an installer inserts the threaded second end of the link 26 through the opening such that the flange is located between the stop out 24 and the second end of the link 26. On either side of the flange, one of the bushings 30 is in direct contact with the stabilizer bar 22 such that the flange is sandwiched between the two bushings 30. Each of the bushings 30 has a through passage and an outer surface. The link 26 extends through the through passage, the outer surface is curved such that the bushing 30 has a greater diameter at an outer end, which faces away from the flange of the stabilizer bar 22, than at an inner end, which directly contacts the flange of the stabilizer bar 22. The bushings 30 are made of a compressible material, such as rubber or a plastic. As forces are transferred through the linkage between the suspension component and the stabilizer bar 22, those forces first must pass through one or both of the bushings 30. When those forces are shock forces, the bushings 30 compress to absorb energy, thereby protecting the connection between the link 26 and the stabilizer bar 22 and improving the durability of the linkage 24.

Figure 3:
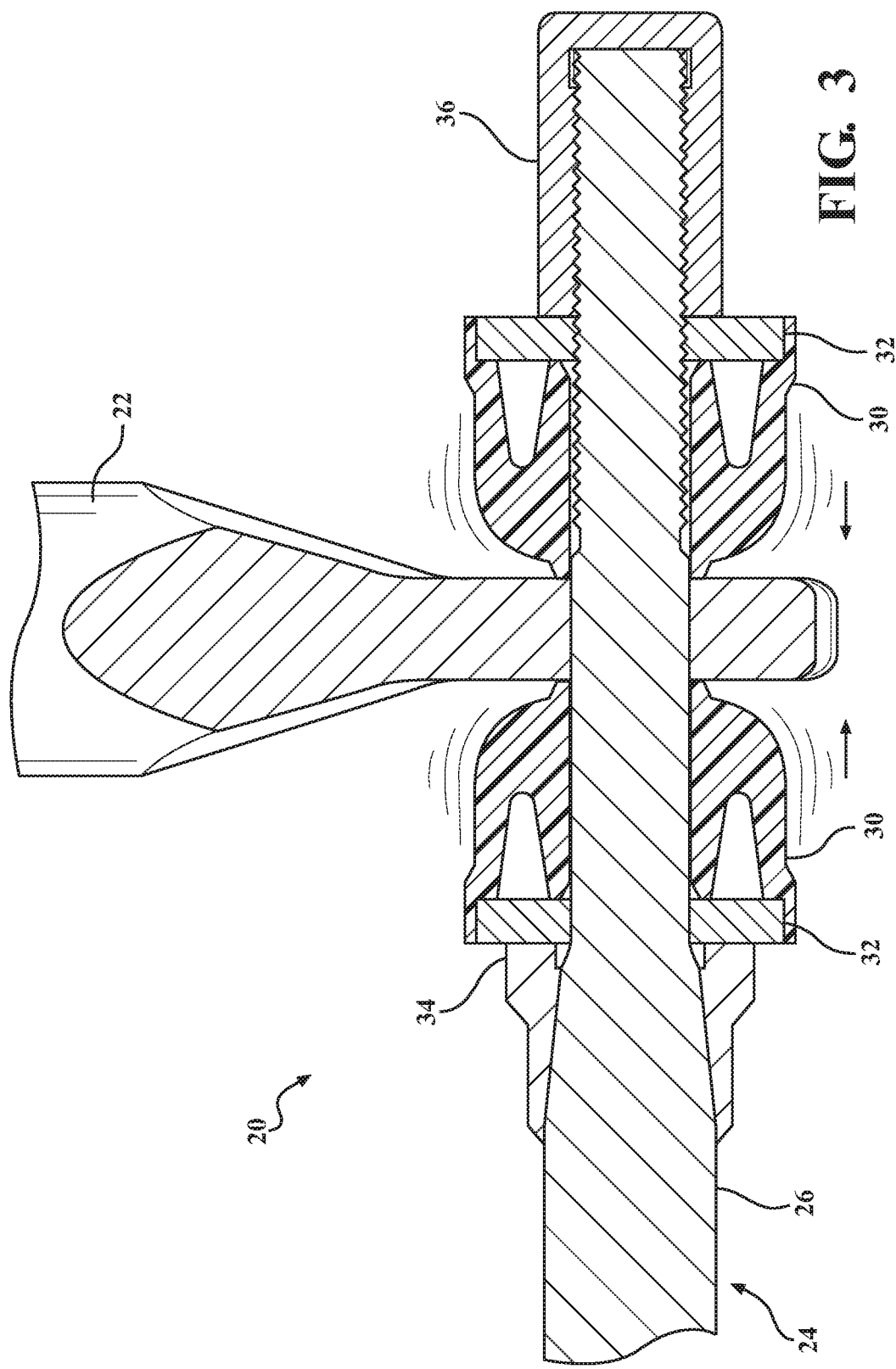
FIG. 3 is an enlarged and cross-sectional view of a portion of FIG. 1.

The outer end of each bushing 30 presents a counterbore which receives one of the washers 32. As shown in FIG. 3, one of the washers 32 is in direct contact with the stop out 34, and the other washer is in direct contact with the locking nut 36. The washers 32 are annular in shape and are generally planar in shape. The washers 32 are preferably made of metal, such as stainless steel. In operation, the washers 32 prevent the outer ends of the bushings 30 form collapsing radially inwardly.

The locking nut 36 has an inner surface which surrounds an inner bore that extends from an open end to a closed end. The inner surface is threaded (female threads) along nearly its full length from the open end to the closed end. At the closed end, the inner surface has a small groove without threads so that the locking nut 36 can be threaded until the second end of the link 26 contacts the closed end of the locking nut 36. The locking nut 36 of the exemplary embodiment has a hexagonally shaped outer surface so that a wrench can be used to rotate the locking nut 36 and tighten it onto the second end of the link 26. However, it should be appreciated that any suitable means can be provided for rotating the locking nut 36. The locking nut 36 is preferably made of metal and may be shaped through any suitable process.

Figure 2:
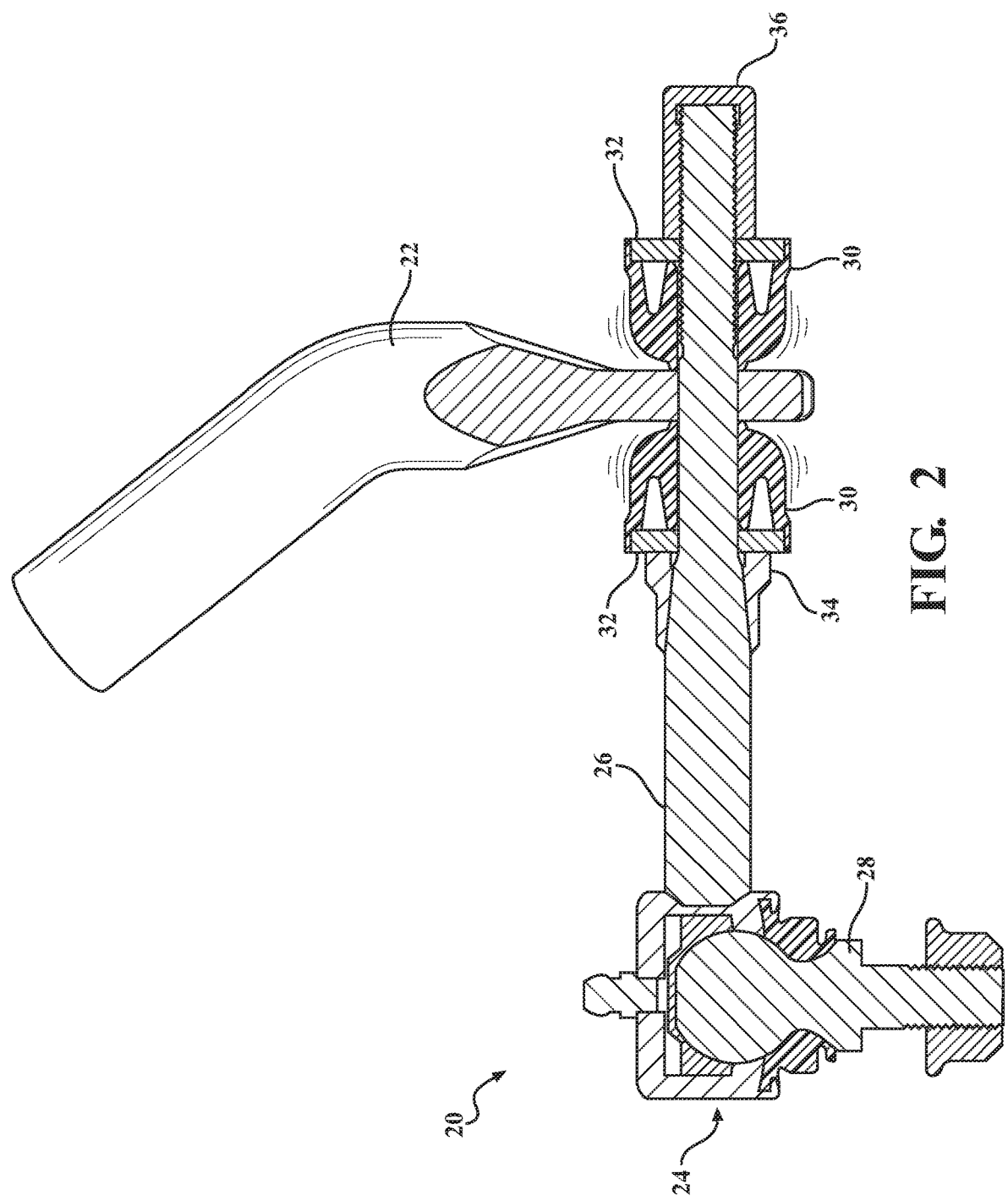
FIG. 2 is a cross-sectional view of the suspension system of FIG. 1.

As shown in FIG. 2, in a direction from the ball joint 28 to the second end, the following components are received on the link 26, in order: the stop out 34, one of the washers 32, one of the bushings 30, the flange of the stabilizer bar 22, the other bushing 30, the other washer 32, and the locking nut 36.

In operation, the stabilizer bar 22 acts as a torsion spring to reduce body roll of the vehicle during fast cornering by resisting relative rotation between the suspension component on the opposite sides of the vehicle. To optimize this performance, it is important that the bushings 30 be precompressed within desired tolerances. The various components of the linkage 24 are configured such that, when the locking nut 36 is threaded all the way onto the link 26 until the end face of the link 26 contacts the closed end of the locking nut 36, the optimized compression is achieved in the bushings 30. This occurs without any need to measure the torque value on the locking nut 36, as is necessary in other known linkages to achieve proper compression of the bushings. This effect is achieved by dimensioning the length of the bore of the locking nut 36 such, when the end face of the link 26 contacts the closed end of the locking nut 36, the distance between the end face of the locking nut 36 that contacts the washer 32 and the stop out 34 is such that the appropriate compression of the bushings 34 is achieved.

Figure 4:
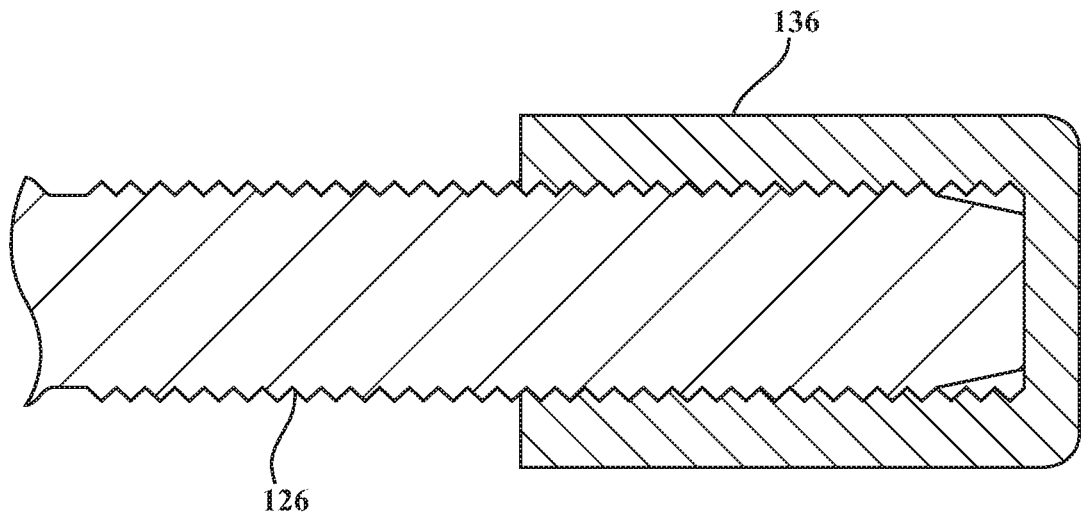
FIG. 4 is a fragmentary and cross-sectional view of a portion of a second exemplary embodiment of a linkage for the suspension system.

Referring now to FIG. 4, a portion of a second exemplary embodiment of the linkage 124 is generally shown with like numerals, separated by a prefix of "1" indicating corresponding parts with the first exemplary embodiment described above. In the second exemplary embodiment, the female threads formed on the inner surface of the locking nut 136 extend the full distance from the open end to the closed end. The outer surface of the link 126, adjacent the end face, is without threads and is tapered radially inwardly. This alternate configuration also allows the end face of the link 126 to contact the closed end of the locking nut 136 when the locking nut 136 is fully threaded onto the link 126.

Figure 5:
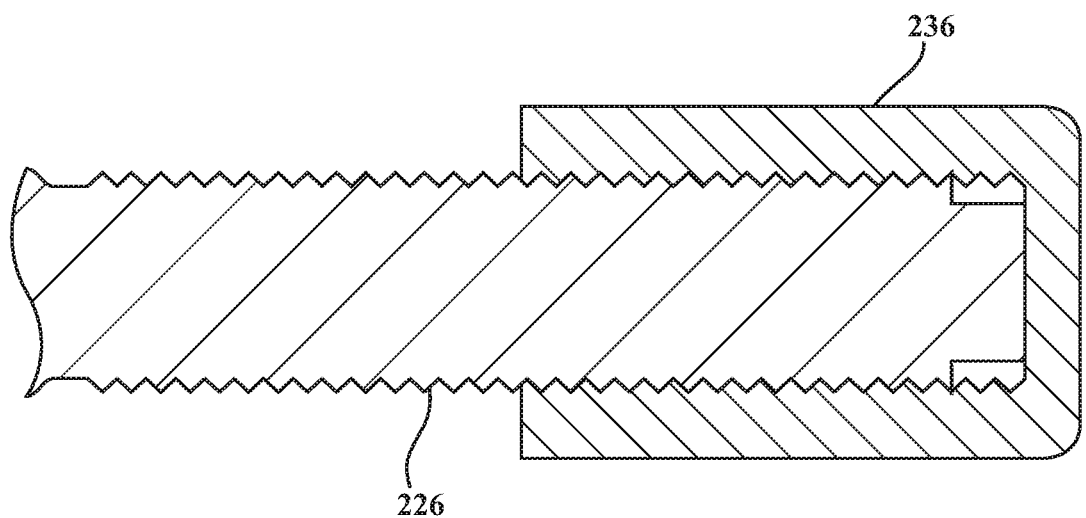
FIG. 5 is a fragmentary and cross-sectional view of a portion of a third exemplary embodiment of a linkage for the suspension system.

Referring now to FIG. 5, a portion of a third exemplary embodiment of the linkage 224 is generally shown with like numerals, separated by a prefix of "2" indicating corresponding parts with the first and second exemplary embodiment described above. The third exemplary embodiment is similar to the second exemplary embodiment but, instead of being tapered, the outer surface of the link 226, adjacent the end face, has an annular recess. This alternate configuration also allows the end face of the link 226 to contact the closed end of the licking nut 236 when the locking nut 236 is fully threaded onto the link 226.

Another aspect of the present invention is related to a method of repairing a suspension system using a linkage 22, such as the linkage 24 shown in FIGS. 1-3. The method includes the step of preparing the stabilizer bar 22. The method proceeds with the step of preparing the link 26. The method continues with the step of inserting a first washer 32 onto the link and establishing contact between the first washer 32 and the stop out 34. The method continues with the step of inserting the first bushing 30 onto the link 26 and establishing contact between the first bushing 30 and the first washer 32. The method proceeds with the step of inserting the link 26 through the opening in the stabilizer bar 22 and establishing contact between the stabilizer bar 22 and the first bushing. The method continues with the step of inserting a second bushing 30 onto the link 26 and establishing contact between the second bushing 30 and the stabilizer bar 22. The method proceeds with the step of inserting the second washer 32 onto the link and establishing contact between the second washer 32 and the second bushing 30. The method continues with the step of threading the locking nut 36 onto the link 26 until the end face of the link 26 contacts the closed end of the locking nut 36 and wherein threading the locking nut 36 onto the link 26 compresses the first and second bushings 30.

Obviously, many modifications and variations of the present invention are possible in light of the above teachings and may be practiced otherwise than as specifically described while within the scope of the appended claims. Additionally, it is to be understood that all features of all claims and all embodiments can be combined with each other as long as they do not contradict each other.

What is claimed is:

1. A suspension system for a vehicle, comprising:
   a stabilizer bar having an opening;
   a linkage having a link and a pair of bushings that are made of a compressible material and having a stop out and having a locking nut;
   said link being rod-shaped and presenting male threads which extend to an end face;
   said rod-shaped link extending through said opening of said stabilizer bar;
   one of said bushings being disposed on said link between said stop out and said opening of said stabilizer bar and the other of said bushings being disposed on said link between said opening of said stabilizer bar and said locking nut;
   said locking nut having an inner surface which surrounds a bore that extends from an open end to a closed end; and
   said bore of said locking nut being dimensioned such that when said end face of said link is in direct contact with said closed end of said locking nut, both of said bushings are partially compressed to predetermined tolerances with the one of said bushings being compressed between said stop out and said stabilizer bar and with the other of said bearings being compressed between said locking nut and said stabilizer bar.

2. The suspension system as set forth in claim 1 wherein said locking nut has an outer surface that has a hexagonal shape.

3. The suspension system as set forth in claim 1 further including a ball joint secured to said link at an opposite end of said link from said end face.

4. The suspension system as set forth in claim 1 wherein each of said bushings extends from an outer end that faces away from said stabilizer bar to an inner end that contacts said stabilizer bar and wherein said outer end has a greater outer diameter than said inner end.

5. The suspension system as set forth in claim 1 further including a pair of washers, one of said washers being disposed between said stop out and the one of said bushings and the other of said washers being disposed between said locking nut and the other of said bushings.

6. The suspension system as set forth in claim 5 wherein said washers are received within counterbores of said bushings.

7. A method of repairing a suspension system in a vehicle, comprising the steps of:
   preparing a stabilizer bar which has an opening;
   preparing a link that is rod-shaped, the link having an end face and male threads adjacent the end face, and the link having a stop out which is spaced from the end face;
   inserting a first washer onto the link and establishing contact between the first washer and the stop out;
   inserting a first bushing onto the link and establishing contact between the first bushing and the first washer;
   inserting the link through the opening of the stabilizer bar and establishing contact between the stabilizer bar and the first bushing;
   inserting a second bushing on the link and establishing contact between the second bushing and the stabilizer bar;
   inserting a second washer onto the link and establishing contact between the second washer and the second bushing; and
   threading a locking nut onto the link until the end face of the link contacts a closed end of the locking nut and wherein the locking nut has a bore that is dimensioned such that when contact is established between the end face of the link and the closed end of the locking nut, the first and second bushings are compressed to a predetermined tolerance range.

8. A linkage for a vehicle suspension system, comprising:
   a link that is rod-shaped and has threads that extend to an end face and that is configured to extend through an opening of a stabilizer bar;
   a pair of bushings that are made of a compressible material, said bushings being configured to be inserted onto said link on opposite sides of the stabilizer bar so that said bushings directly contact the stabilizer bar;
   a locking nut having a bore that extends from an open end to a closed end and is threaded;
   said bore of said locking nut being dimensioned such that when said end face of said link directly contacts said closed end of said locking nut, both of said bushings are compressed to within tolerances.

9. The linkage as set forth in claim 8 wherein said locking nut has an outer surface that has a hexagonal shape.

10. The linkage as set forth in claim 8 further including a ball joint secured to said link at an opposite end of said link from said end face.

11. The linkage as set forth in claim 8 wherein each of said bushings extends from an outer end that faces away from said stabilizer bar to an inner end that contacts said stabilizer bar and wherein said outer end has a greater outer diameter than said inner end.

12. The linkage as set forth in claim 8, further including a pair of washers, one of said washers being configured to be positioned between a stop out on said link and one of said bushings and the other of said washers being configured to be disposed between said locking nut and the other of said bushings.

13. The linkage as set forth in claim 12 wherein said washers are configured to be received within counterbores of said bushings.

14. A method of making a linkage, comprising the steps of:
   preparing a link that is rod-shaped and has threads that extend to an end face and that is configured to extend through an opening of a stabilizer bar;
   preparing a pair of bushings that are made of a compressible material, the bushings being configured to be inserted onto the link on opposite sides of the stabilizer bar so that the bushings directly contact the stabilizer bar;
   making a locking nut having a bore that extends from an open end to a closed end and is threaded;
   the step of making the locking nut including dimensioning the bore of the locking nut such that when the end face of the link directly contacts the closed end of the locking nut, both of the bushings are compressed to within tolerances.

15. The method as set forth in claim 14 wherein the locking nut has an outer surface that has a hexagonal shape.

16. The method as set forth in claim 14 further including a ball joint secured to the link at an opposite end of the link from the end face.

17. The method as set forth in claim 14 wherein each of the bushings extends from an outer end that faces away from the stabilizer bar to an inner end that contacts the stabilizer bar and wherein the outer end has a greater outer diameter than the inner end.

18. The method as set forth in claim 14, further including a pair of washers, one of the washers being configured to be positioned between a stop out on said link and one of said bushings and the other of the washers being configured to be disposed between the locking nut and the other of the bushings.

19. The method as set forth in claim 18 wherein the washers are configured to be received within counterbores of the bushings.

20. The method as set forth in claim 14 further including the step of installing inserting the link through an opening in the stabilizer bar and tightening the locking nut until the end face of the link directly contacts the closed end of the locking nut.

\* \* \* \* \*